Oct. 30, 1945.    J. D. BOLESKY    2,388,113
CONTROL DEVICE
Original Filed April 5, 1939    3 Sheets-Sheet 1
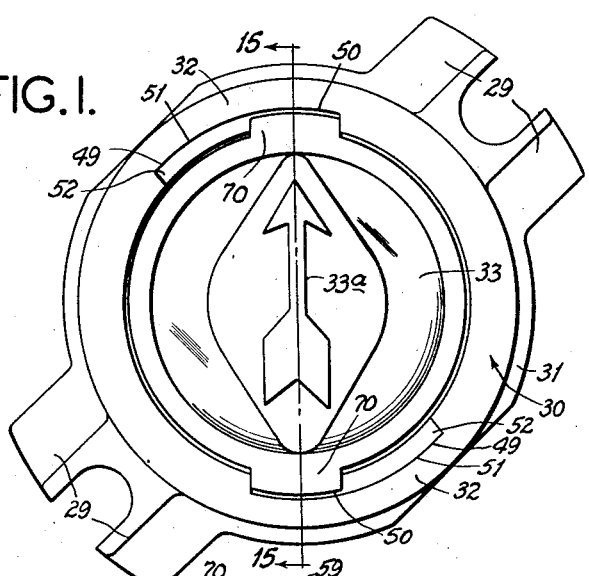
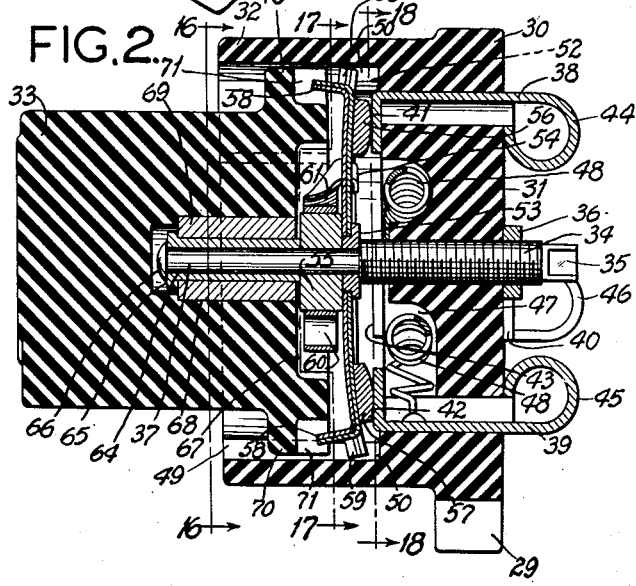
John D. Bolesky
Inventor
Haynes and Koenig
Attorneys Oct. 30, 1945.  J. D. BOLESKY  2,388,113
CONTROL DEVICE
Original Filed April 5, 1939   3 Sheets-Sheet 2

John D. Bolesky
Inventor
Haynes and Koenig
Attorneys

Oct. 30, 1945. J. D. BOLESKY 2,388,113
CONTROL DEVICE
Original Filed April 5, 1939 3 Sheets-Sheet 3

John D. Bolesky
Inventor
Haynes and Koenig
Attorneys

Patented Oct. 30, 1945

2,388,113

UNITED STATES PATENT OFFICE 2,388,113

CONTROL DEVICE

John D. Bolesky, Attleboro, Mass., assignor to Metals & Controls Corporation, Attleboro, Mass., a corporation of Massachusetts Original application April 5, 1939, Serial No. 266,078. Divided and this application January 2, 1943, Serial No. 471,140

8 Claims. (Cl. 200—138)

This invention relates to control devices, and, with regard to certain more specific features, to electric snap switches and valves, for example, of both thermally and manually actuated types.

This application is a division of my copending application Serial No. 266,078, filed April 5, 1939, now Patent 2,327,336.

Among the several objects of the invention may be noted the provision of a control device of the class described, which is capable of automatic operation to one controlling condition, but which is incapable of automatic operation to a second controlling condition, requiring manual actuation therefor; the provision of a thermally responsive switch of the class described which in case of excess currents being drawn by the motor (or other electrical device) will automatically break the circuit connections to the device; the provision of a tnermally responsive control device of the class described which requires manual resetting in order again to actuate the device; the provision of an electric switch of the class described which is so constructed as to include novel means for preventing the formation of contact-destroying arcs; and the provision of control devices of the class described which are relatively economical to make, and safe in operation. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a top plan view of a form of switch embodying the present invention;

Fig. 2 is a vertical cross section taken substantially along line 16—16 of Fig. 1;

Figures 3, 4 and 5 are cross sections taken substantially along lines 16—16, 17—17 and 18—18, respectively, of Fig. 2;

Similar reference characters indicate corresponding parts throughout the several views of the drawings.

Figure 3:
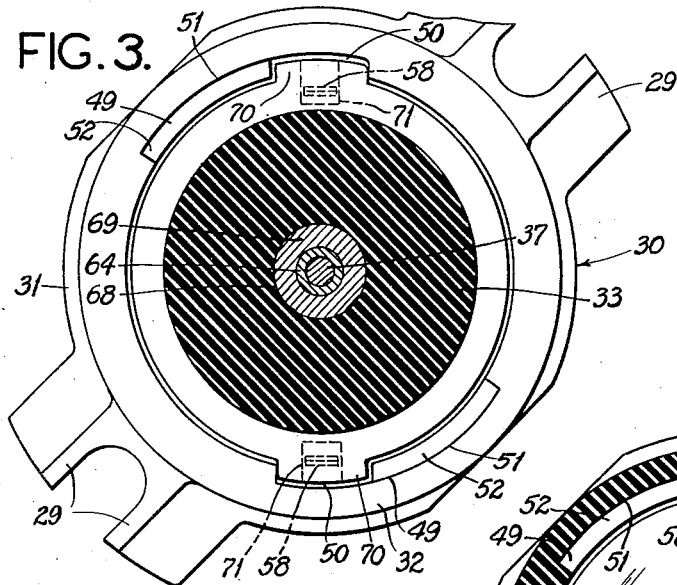

While the present invention comprehends control devices of all sorts, its principal embodiment comprises an electric switch actuatable thermally and particularly adapted for motor protection usages. Other embodiments will also be described hereinafter. Electric switches of the type mentioned are used to make and break electrical circuits on the exceeding of certain safe electrical current values in the motor power circuit. Switches of this type are sometimes called "thermal cutouts" and more particularly when applied to electric motors, "motor overload protective devices." While the switch embodiments of the present invention are applicable to other electrical devices than motors, the invention will be explained and illustrated in an embodiment as applied to motors.

Figures 1 through 7 show a practical switch embodiment of the invention following the general principles set forth in my Patent No. 2,327,336, referred to above. The embodiment of Figures 1 through 7 has been particularly designed for use as a "thermal cutout," or "motor overload protective device." This switch has the very practical feature that it automatically breaks circuit connections when the current value exceeds a predetermined limit, or when the ambient temperature exceeds a predetermind limit. This switch will not re-set itself automatically; that is to say, once circuit connections have been broken, manual actuation is needed in order to reestablish such circuit connections. This is a valuable protective feature in connection with motor overload protection. The switch is so constructed, however, that it may be manually disconnected or connected at any time; and it is accordingly useful as a starting and stopping switch for the motor.

Referring to Figures 1 through 7, numeral 30 indicates a base for the switch of cup-like construction, comprising a bottom portion 31 and an upstanding, generally cylindrical wall 32. Projecting out of the top of the cup-shaped base 30 is a generally cylindrical control knob 33, the particular construction of which will be given in greater detail hereinafter. Both the base 30 and the knob 33 are preferably made of an electrical insulating material, such as molded Bakelite, porcelain, etc. Base 30 is preferably provided with external mounting ears 29.

Mounted centrally in the bottom 31 of the base 30 is a threaded post 34, which has a polygonal head 35 for adjusting purposes. A lock nut 36 secures the relative adjustment of the post 34 in the bottom 31. On the other side of the bottom 31, the post 34 is extended into knob 33 as an unthreaded cylindrical portion 37 of reduced diameter.

Figure 5:
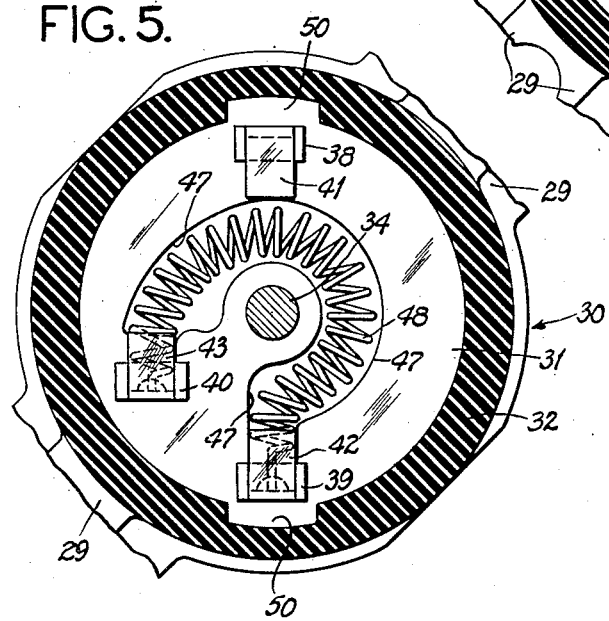

Extending through the bottom 31 of the base 30 are three electrical terminal pieces 38, 39 and 40, the angular disposition of which about the post 34 is indicated in Fig. 5. Terminal pieces 38 and 39, it will be seen, are diametrically opposite each other. The angular position of terminal piece 40 is relatively immaterial.

The terminal pieces 38, 39 and 40 comprise sheet metal stampings which are force-fitted into the bottom 31 of base 30, affording internal contact faces 41, 42 and 43, respectively, and external loops 44, 45 and 46, respectively, to which external connections may be made as by soldering. The particular construction of the terminal pieces 38, 39 and 40 is immaterial to the present invention, and hence need not be described at length herein.

Internally of the cup-shaped base 30, the surface of bottom 31 is provided with a substantially annular groove 47, which extends approximately concentrically about the post 34 from terminal piece 39 to terminal piece 40. In the groove 47 is positioned a coiled electrical resistance heater wire 48. One end of the heater wire 48 is electrically connected to terminal piece 39, while the other end is electrically connected to terminal piece 40.

The internal wall of the cylindrical portion 32 of the base 30 is provided with diametrically opposite bayonet-type notches 49, extending through, say, about 60° of arc. The notches 49 have, at one diametrically opposite end of each, relatively deeper portions 50, extending through about, say, 25° of arc, and bottoming on the inner surface of the bottom 31. The notches 49 also have relatively shallower diametrically opposite portions 51, which terminate downwardly as flat ledges or platforms 52.

Mounted on the reduced diameter portion 37 of post 34, on the shoulder afforded by the termination of the threaded portion of said post 34, is a peripherally grooved collar 53, into the groove of which relatively loosely fits the internal periphery of a perforated thermostatic metal disc 54 of the same general type as the disc 23 shown in Fig. 10 of my said Patent No. 2,327,336. The disc 54 is held in position in the groove 53 by a polygonal, preferably hexagonal collar or nut 55, which clamps down on the collar 53. The collar 55 is force-fitted to the reduced diameter portion 37 of post 34, so that it cannot rotate relative thereto. On the surface of disc 54 facing the bottom 31 are mounted, as by welding, in diametrically opposite positions, a pair of contact buttons 56 and 57, which are positioned at suitable radial distances to engage contact plates 41 and 42 when the disc 54 is concave to the right, as illustrated in Figures 2 and 4.

Figure 4:
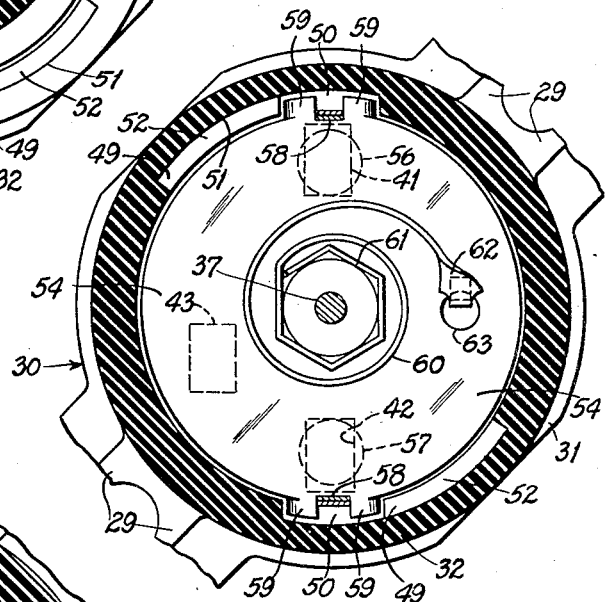

Referring now more particularly to Figures 2 and 4, it will be seen that the disc 54 is provided, at diametrically spaced points on its periphery, with a pair of upstanding ears 58. On each side of each ear 58 is a projection 59 extending outwardly from the periphery of the disc 54, but relieved slightly from said disc for a portion of its length remote from the ear 58 in order to be bent upwardly to form a sloping surface of an inclined-plane, camming character. The slope is opposite in direction for each projection of the pair on either side of each ear 58.

The disc 54, it will be understood, rotates freely in the groove of collar 53, relative to the post 34.

Numeral 60 indicates a coil spring, of general type of a watch spring, the inner end 61 of which is polygonally formed in order to embrace the periphery of polygonal collar 55. The outer end 62 of spring 60 is turned into substantially the plane of disc 54, and at its extremity is hooked into a hole 63 in the disc 54 provided for that purpose. Coil spring 60 is normally in tension, and, reacting centrally on the polygonal collar 55 (which, it will be recalled, is relatively non-rotatable with respect to the post 37), it tends at all times to rotate the disc 54, relative to the post 37, in a counterclockwise manner, considered from the viewpoint represented by Fig. 4. Adjustment of the amount of tension in the spring 60 may be made by slipping its polygonal inner end 61 around the polygonal collar 55. In order to do this, the inner end 61 is momentarily pried away from the surface of collar 55. In normal operation, however, the polygonal portion 61 of the spring 60 effectively anchors it to the collar 55 in a relatively non-movable manner.

Surmounting the polygonal collar 55 on the reduced diameter portion 37 of post 34 is a relatively long sleeve 64, the outer end of which is outwardly flanged as indicated at numeral 65. Preferably the sleeve 64 is a forced-fit on the post portion 37, so that it does not rotate relative thereto. Beyond the flange 65, reduced diameter portion 37 is preferably upset and headed over, as indicated at numeral 66.

The inner face of knob 33 is provided with a circular depression 67 of sufficient depth substantially to enclose the coil spring 60. Extending inwardly from the center of the depression 67 is a cylindrical hole 68, into the emergent end of which is force-fitted a collar or bushing 69 that turns freely on the sleeve 64 on post portion 37. The knob 33 as a whole is thus rotatable relative to the shaft 34, as is the thermostatic disc 54.

Extending outwardly from the outer periphery of knob 33, at the inner end thereof, are diametrically opposite projections 70. Each projection 70 includes, in its under surface and at its outer edge, a notch 71 of sufficient width freely to receive the upstanding projection 58 on the periphery of thermostatic disc 54. The notches 71 are of sufficient depth to accommodate said projections 58 regardless of the direction of concavity of the disc 54.

The projections 70 extend radially outwardly sufficiently far so that they fit only into the bayonet-type notches 49 in the base member 30. By abutting the ends of said bayonet notches 49, the said projections 70 limit the rotative movement of the knob 33 in the base 30.

As shown in Fig. 1, the outer face or end of the knob 33 is preferably provided with a position-indicating means, such as the arrow 33a.

Despite its more complex form, the embodiment of Figures 1 through 7 operates in substantially the same manner as the embodiment shown in Fig. 10 of my said Patent No. 2,327,336. That is to say, when the thermostatic disc 54 is below a certain temperature, it is concave to the right, in Fig. 2, and it provides pressure between the contacts 56 and 41, and 57 and 42, respectively, sufficiently great that the interfacial friction therebetween prevents the disc 54 from rotating under the influence of coil spring 60. When, however, the temperature of the disc 54 increases sufficiently in amount, said disc snaps or moves to a position of opposite concavity, i. e., concave to the left in Fig. 2, and in so doing it lifts the contacts 56 and 57 from the contacts 41 and 42. There is then no frictional deterrent to the rotative influence of the spring 60, and consequently the thermostatic disc 54 rotates on the post 37 in a counterclockwise manner, to the position shown in Fig. 6. When the disc 54 rotates, it carries with it the knob 33, by engagement of the upstanding projections 58 with the notches 71. The projections 59 do not interfere with this rotative movement, because when the disc 54 is concave to the left in Fig. 2, said projections 59 are raised above the level of the ledges 52 bottoming the notch portions 51 in base 30.

Figure 6:
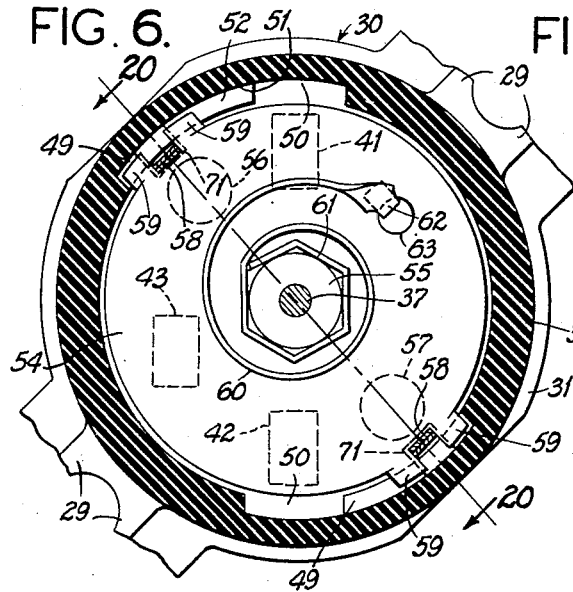
Fig. 6 is a view similar to Fig. 4, illustrating an alternative operating position of the Fig. 1 switch.
Figure 7:
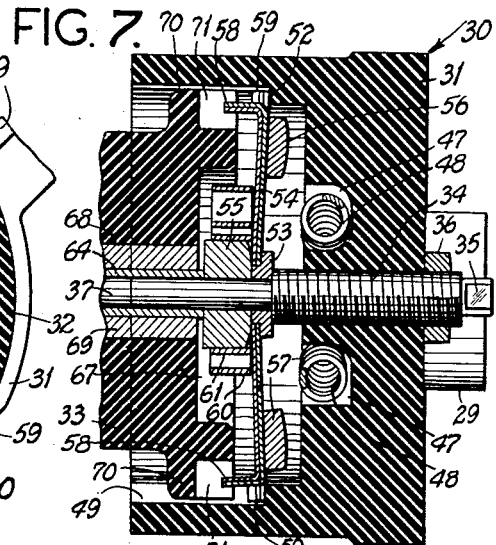
Fig. 7 is a vertical cross section taken substantially along line 20—20 of Fig. 6.

Assuming now that the disc 54 cools while in its Fig. 6 position, it will snap back to its original position of concavity, i. e., concave to the right in Fig. 2. However, under normal conditions there is no automatic tendency for the disc to rotate back to its Fig. 4 position, so it does not do so, but remains in its Fig. 6 angular position. The projections 59 thus come to rest upon the ledges 52, as shown in Fig. 7. The movable contacts 56 and 57 are now held out of engagement with the fixed contacts 41 and 42 both by reason of the angular displacement of disc 54 and base 30, and by reason of the fact that the engagement of projections 59 with ledges 52 mechanically prevents the disc 54 from overcentering all of the way to its position of right-hand concavity.

After the disc 54 has thus assumed the Fig. 7 position, it is necessary manually to rotate the knob 33 in a clockwise manner to reestablish circuit connections. By such rotation, the disc 54 is rotated in a clockwise manner through the engagement of projections 58 with notches 71, and as the projections 59 pass off the ledges 52, said projections sink into the deeper notch portions 50, and bring the relatively movable contacts 56 and 57 back into juxtaposition with the relatively fixed contacts 41 and 42.

The positioning of the projections 59 in the deeper notch portions 50 provides an additional securing means against counterclockwise rotation of the disc 54 under the influence of the coil spring 60, unless said disc 54 is snapped over to its position of leftward concavity.

It will thus be seen that the switch as described is fully capable of automatic circuit-breaking operations, but capable only of manual circuit-making operation once it has been opened.

The construction is such, however, that the switch may be manually opened at any time. This is because the sloping character of the projections 59 makes it possible manually to rotate the knob 33, and with it the disc 54, in a counterclockwise manner from the Fig. 4 to the Fig. 6 position. The sloping faces of these projections 59, ride up on the ledges 52 under such manual actuation of the knob 33. It is thus seen that the switch is capable of manual disconnecting operation as well as automatic disconnecting operation. It may accordingly be used as a simple on and off switch for an electric motor, for example, with the additional feature of automatic overload protection in its automatic disconnecting capabilities.

By adjusting the threaded portion of post 34 in base 30 an adjustment of the operating, or snapping temperature of disc 54 is brought about. The reasons for such action are described at length elsewhere, and need not be repeated herein. Lock nut 36 secures such adjustment once it is made.

Figure 8:
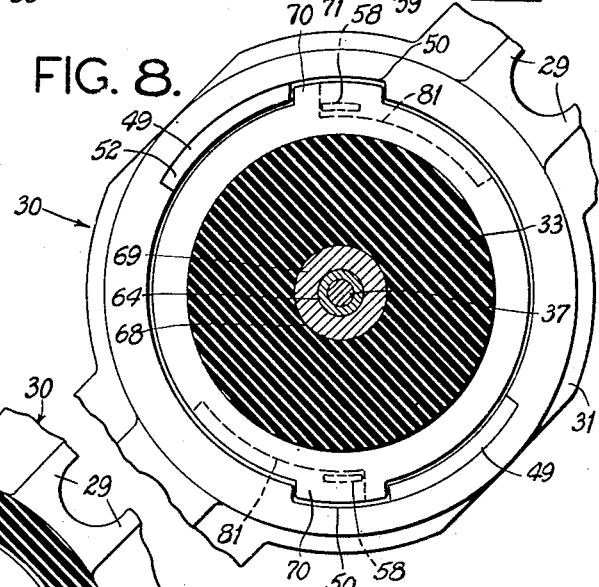
Fig. 8 is a cross section similar to Fig. 6, illustrating another switch embodiment of the present invention.
Figure 9:
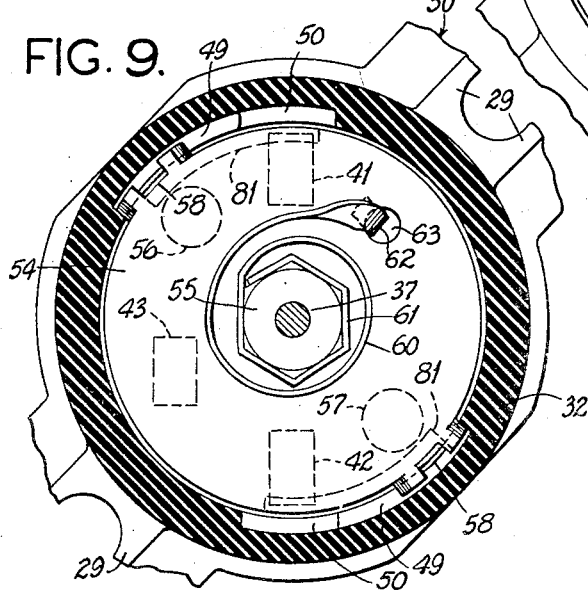
Fig. 9 is a cross section similar to Fig. 8, showing the switch thereof in an alternative position.

Figs. 8 and 9 illustrate an embodiment of the invention that operates somewhat differently than the previous embodiments. In this Fig. 8 embodiment it is impossible manually to turn off the switch once it is turned on (such turning off being solely automatic), while it is impossible automatically to turn on the switch once it has been turned off (such turning on being accomplished solely manually). In prior embodiments the switch can be turned on or off, manually, at any time. Switches of the present type are of use in connection with certain types of circuit controls.

Referring to Figures 8 and 9, it will be seen that the peripherally relatively short notches 71 in the projections 70 on knob 33 are replaced by notches 81 that extend a relatively much longer peripheral distance around the under face of knob 33. In fact, the angular extent of the notches 81 is preferably only slightly less than the angular extent of the bayonet-like notches 49 in space 30. By this simple expedient the desired action of the switch is brought about. It will clearly be seen that, with the Fig. 8 embodiment, and the switch in circuit making position, if the knob 33 is rotated in a counterclockwise manner (the same movement that in the Fig. 1 embodiment manually disconnected the switch), the disc 54 will not change in angular position, because the projections 58 will slide freely in the elongated notches 81 until the projections 70 on knob 33 abut the ends of bayonet-like notches 49.

However, when said switch has assumed its automatically disconnected position, and the disc is rotated to the full extent in a counterclockwise position, as illustrated in Fig. 9, it may be manually brought back to connecting position in the manner heretofore described, because in this event the projections 58 are engaged by operative ends of the notches 81.

The embodiment of Fig. 8, therefore, is capable solely of automatic disconnecting operation, and capable solely of manual connecting operation.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A control device comprising a base, a resilient plate mounted substantially parallel to said base and rotatable with respect thereto between two limiting angular positions on an axis perpendicular to the base, at least one projecting member carried by said plate and forced by the resilience thereof against said base, means for manually rotating said plate relative to said base, means limiting the movement of said last-named means to determine the said limiting positions, control-effecting elements determined as to condition by the relative angular positioning of said plate on said base, and means interconnecting said plate and said manually operable means such that said manually operable means is effective to move said plate from one limiting position to the other limiting posiiton, but is ineffective to move said plate in the reverse direction.

2. A control device comprising a base, a resilient thermostatic plate mounted substantially parallel to said base and rotatable with respect thereto between two limiting angular positions on an axis perpendicular to the base, at least one projecting member carried by said plate and forced by the resilience thereof against said base, means for manually rotating said plate relative to said base, means limiting the movement of said last-named means to determine the said limiting positions, control-effecting elements determined as to condition by the relative angular positioning of said plate on said base, and means interconnecting said plate and said manually operable means such that said manually operable means is effective to move said plate from one limiting position to the other limiting position, but is ineffective to move said plate in the reverse direction.

3. A control device comprising a base, a resilient thermostatic disc mounted substantially parallel to said base and rotatable with respect thereto between two limiting angular positions on an axis perpendicular to the base, at least one projecting member carried by said disc and forced by the resilience thereof against said base, means for manually rotating said disc relative to said base, means limiting the movement of said last-named means to determine the said limiting positions, control-effecting elements determined as to condition by the relative angular positioning of said disc on said base, and means interconnecting said disc and said manually operable means such that said manually operable means is effective to move said disc from one limiting position to the other limiting position, but is ineffective to move said disc in the reverse direction.

4. A control device comprising a base, a resilient thermostatic disc mounted substantially parallel to said base and rotatable with respect thereto between two limiting angular positions on an axis perpendicular to the base, two projecting members carried by said disc and forced by the resilience thereof against said base, means for manually rotating said disc relative to said base, means limiting the movement of said last-named means to determine the said limiting positions, control-effecting elements determined as to condition by the relative angular positioning of said disc on said base, and means interconnecting said disc and said manually operable means such that said manually operable means is effective to move said disc from one limiting position to the other limiting position, but is ineffective to move said disc in the reverse direction.

5. A control device comprising a base, a resilient thermostatic disc mounted substantially parallel to said base and rotatable with respect thereto between two limiting angular positions on an axis perpendicular to the base, two projecting contacts carried by said disc and forced by the resilience thereof against said base, means for manually rotating said disc relative to said base, means limiting the movement of said last-named means to determine the said limiting positions, stationary contacts on said base positioned to engage said movable contact when said disc is in one limiting position, and means interconnecting said disc and said manually operable means such that said manually operable means is effective to move said disc from one limiting position to the other limiting position, but is ineffective to move said disc in the reverse direction.

6. A control device comprising a base, a resilient plate mounted on said base and rotatable with respect thereto, at least one projecting member carried by said plate and forced by the resilience thereof into frictional engagement with said base, means for rotating said plate relative to said base from one limiting position to another limiting position but ineffective to move said plate in the reverse direction and control-effecting elements determined as to condition by the relative rotative positioning of said plate on said base.

7. A control device comprising two relatively rotary members, at least one contact carried on one of the members, a resilient plate mounted on the other member, a contact on said plate adapted to engage and disengage the first-named contact upon relative rotary movement, means connecting the relatively rotary parts for biasing the plate in a direction to press the contacts when they are closed and to tension said plate, and means interconnecting said plate and said other member so that said rotary movements are effective to move said plate from one limiting position to another limiting position but are ineffective to move said plate in the reverse direction.

8. A control device comprising a base, a resilient plate mounted on said base and rotatable with respect thereto, said plate having formed therein a projecting part, and said projecting part being forced by the resilience of said plate into frictional engagement with said base, means for rotating said plate relative to said base from one limiting position to another limiting position but ineffective to move said plate in the reverse direction, and control effecting elements determined as to condition by the relative rotative positioning of said plate on said base.

JOHN D. BOLESKY.